(12) United States Patent
Kukula et al.

(10) Patent No.: US 7,579,414 B2
(45) Date of Patent: Aug. 25, 2009

(54) FINE-PARTICLED AMPHOTERIC AQUEOUS POLYMER DISPERSION METHOD FOR PRODUCTION AND USE THEREOF

(75) Inventors: Hildegard Kukula, Mannheim (DE); Roland Ettl, Ketsch (DE); Rainer Dyllick-Brenzinger, Speyer (DE); Bernhard Sturm, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 207 days.

(21) Appl. No.: 11/569,912

(22) PCT Filed: Jun. 3, 2005

(86) PCT No.: PCT/EP2005/005961

§ 371 (c)(1),
(2), (4) Date: Dec. 1, 2006

(87) PCT Pub. No.: WO2005/121195

PCT Pub. Date: Dec. 22, 2005

(65) Prior Publication Data

US 2008/0039598 A1  Feb. 14, 2008

(30) Foreign Application Priority Data

Jun. 7, 2004  (DE) .................. 10 2004 027 735

(51) Int. Cl.
*C08F 2/00* (2006.01)

(52) U.S. Cl. .................. 526/65; 526/328; 526/329.3

(58) Field of Classification Search .................. 524/555
See application file for complete search history.

(56) References Cited

U.S. PATENT DOCUMENTS

| | | | |
|---|---|---|---|
| 4,051,093 A | 9/1977 | Wendel et al. | |
| 4,434,269 A | 2/1984 | Probst et al. | |
| 4,659,431 A | 4/1987 | Probst et al. | |
| 6,114,417 A * | 9/2000 | O'Toole et al. | ............... 524/27 |
| 2002/0040088 A1* | 4/2002 | Hauschel et al. | ............ 524/460 |
| 2003/0072950 A1 | 4/2003 | Rodrigues et al. | |

FOREIGN PATENT DOCUMENTS

| | | |
|---|---|---|
| DE | 24 52 585 | 5/1976 |
| DE | 24 54 397 | 5/1976 |
| EP | 0 051 144 A1 | 5/1982 |
| EP | 0 058 313 | 8/1982 |
| EP | 1 180 527 A1 | 2/2002 |
| WO | WO 00/44983 A1 * | 8/2000 |

OTHER PUBLICATIONS

Polymer Latices: Science and Technology, 2nd edition, D.C. Blackley (Springer 1997).*

* cited by examiner

*Primary Examiner*—David Wu
*Assistant Examiner*—Vu Nguyen
(74) *Attorney, Agent, or Firm*—Oblon, Spivak, McClelland, Maier & Neustadt, P.C.

(57) ABSTRACT

Finely divided, amphoteric, aqueous polymer dispersions which are obtainable by a two-stage polymerization, a prepolymer being prepared in the first polymerization stage from a monomer mixture comprising (a) from 15 to 40% by weight of at least one (meth)acrylate and/or (meth)acrylamide having in each case a free amino group, protonated amino group and/or quaternized amino group,
(b) from 40 to 70% by weight of at least one optionally substituted styrene,
(c) from 0 to 25% by weight of acrylonitrile and/or methacrylonitrile,
(d) from 0.5 to 5% by weight of at least one ethylenically unsaturated monomer comprising acid groups and
(e) from 0 to 30% by weight of at least one nonionic, ethylenically unsaturated monomer differing from (b) and (c), the sum of (a)+(b)+(c)+(d)+(e) being 100% by weight, in a solution polymerization in a solvent partly to completely miscible with water, water then being added to the solution/dispersion of the prepolymer and then at least one nonionic, ethylenically unsaturated monomer being subjected to an emulsion polymerization in the aqueous solution of the prepolymer in a second polymerization stage, processes for the preparation of the polymer dispersions by two-stage polymerization and use of the polymer dispersions as sizes for paper, board and cardboard.

13 Claims, No Drawings

FINE-PARTICLED AMPHOTERIC AQUEOUS POLYMER DISPERSION METHOD FOR PRODUCTION AND USE THEREOF

The invention relates to finely divided, amphoteric, aqueous polymer dispersions which are obtainable by a two-stage polymerization, a monomer mixture comprising cationic and anionic monomers being polymerized in the first polymerization stage in a solvent partly to completely miscible with water by a solution polymerization method, the solution being diluted with water and, in the second polymerization stage, at least one nonionic, ethylenically unsaturated monomer being polymerized by an emulsion polymerization method in the reaction mixture thus obtainable, processes for their preparation and their use as sizes for paper, board and cardboard.

DE-A-24 52 585 discloses aqueous copolymer dispersions which are obtainable by a two-stage polymerization in the aqueous phase, a copolymer first being copolymerized from a monomer containing acid groups and an ethylenically unsaturated monomer having a tertiary or quaternary amino group or a nitrogen-comprising heterocyclic group in the aqueous phase and styrene and/or acrylonitrile and, if appropriate, (meth)acrylate and, if appropriate, further olefinically unsaturated monomers then being added with further copolymerization and polymerization being completed. The polymer dispersions thus prepared are used as sizes for paper.

DE-A-24 54 397 discloses cationic aqueous copolymer dispersions which are prepared by emulsion copolymerization of olefinically unsaturated monomers in the presence of cationic polymeric dispersants/protective colloids. For this purpose, a prepolymer is synthesized by solution polymerization of hydrophobic ethylenically unsaturated monomers with monomers which comprise quaternary or ternary nitrogens in water-miscible solvents, preferably alcohols or acetone. After addition of water and formic acid in order to protonate tertiary amino groups, hydrophobic monomers, such as styrene, acrylonitrile, (meth)acrylates and/or butadiene, if appropriate with up to 10% by weight of α,β-monoolefinically unsaturated carboxylic acids, are then copolymerized in the aqueous solution of the prepolymer by an emulsion polymerization method. The monomers are chosen so that the glass transition temperature of the copolymer is from −15 to +60° C. The dispersions thus obtainable are used as coating materials for paper, leather or textile sheet-like structures and as sizes for paper.

EP-A-0 051 144 describes amphoteric, finely divided, aqueous polymer dispersions which are prepared by a two-stage polymerization. In the first stage of the preparation, a low molecular weight prepolymer is synthesized in a solution copolymerization in a water-miscible solvent, the monomer mixture used comprising, in addition to further monomers, from 0.5 mol to 1.5 mol of an ethylenically unsaturated carboxylic acid in each case per mole of a nitrogen-containing monomer which carries an amino group and/or a quaternary amino group. The prepolymer is then dispersed in water and reacted in an emulsion polymerization with nonionic, ethylenically unsaturated monomers with the use of conventional water-soluble initiators. The dispersions obtained are used as engine sizes and surface sizes for paper.

EP-A-0 058 313 discloses cationic sizes for paper which are obtainable by first preparing a water-soluble cationic terpolymer consisting of N,N-dimethylaminoethyl acrylate and/or methacrylate, styrene and acrylonitrile by solution polymerization in an alcohol. It is said that after a subsequent quaternization reaction, at least 10% of the N,N-dimethylamino groups present are present in quaternized form and the remainder in protonated form. This terpolymer is used as an emulsifier in the subsequent free radical emulsion polymerization of a monomer mixture of acrylonitrile/methacrylonitrile and (meth)acrylates.

U.S. Pat. No. 4,659,431 describes a cationic size for paper which is likewise prepared by a two-stage process. First, a terpolymer is prepared by polymerizing a monomer mixture consisting of N,N-dimethylaminoethyl acrylate and/or methacrylate, styrene and acrylonitrile by a solution polymerization method in an alcohol. Thereafter, at least 10% of the N,N-dimethylamino groups are in quaternized form while the remainder is present in protonated form. The terpolymer is used as an emulsifier in the free radical emulsion polymerization of a monomer mixture which comprises up to 90% by weight of acrylonitrile and/or methacrylonitrile, from 5 to 95% by weight of styrene and from 5 to 95% by weight of (meth)acrylate.

EP-A-1 180 527 discloses cationic, finely divided, aqueous polymer dispersions which are used as engine sizes and surface sizes for paper. The preparation of the dispersion is likewise effected in a two-stage process in which first a solution polymer is synthesized in a saturated $C_1$- to $C_6$-carboxylic acid and is then used in an emulsion polymerization of an optionally substituted styrene and of a (meth)acrylate. The emulsion polymerization is carried out using conventional, water-soluble initiators, e.g. peroxides, together with redox systems.

It is the object of the present invention to provide further polymer dispersions which have improved efficiency as sizes for paper compared with the known polymer dispersions.

The object is achieved, according to the invention, by finely divided, amphoteric, aqueous polymer dispersions which are obtainable by a two-stage polymerization, a prepolymer being prepared in the first polymerization stage from a monomer mixture comprising (a) from 15 to 40% by weight of at least one (meth)acrylate and/or (meth)acrylamide having in each case a free amino group, protonated amino group and/or quaternized amino group, (b) from 40 to 70% by weight of at least one optionally substituted styrene, (c) from 0 to 25% by weight of acrylonitrile and/or methacrylonitrile, (d) from 0.5 to 5% by weight of at least one ethylenically unsaturated monomer comprising acid groups and (e) from 0 to 30% by weight of at least one nonionic, ethylenically unsaturated monomer differing from (b) and (c), the sum of (a)+(b)+(c)+(d)+(e) being 100% by weight, in a solution polymerization in a solvent partly to completely miscible with water, water then being added to the solution/dispersion of the prepolymer and then at least one nonionic, ethylenically unsaturated monomer being subjected to an emulsion polymerization in the aqueous solution of the prepolymer in a second polymerization stage.

In the second polymerization stage, preferably a monomer mixture comprising (a) from 0 to 80% by weight of at least one optionally substituted styrene, (b) from 0 to 100% by weight of at least one $C_1$- to $C_{18}$-(meth)acrylate and (c) from 0 to 30% by weight of at least one nonionic ethylenically unsaturated monomer differing from (a) and (b), the sum of (a)+(b)+(c) being 100% by weight, is polymerized in the presence of initiators.

Preferably, in the first polymerization stage, a prepolymer is prepared by polymerizing a monomer mixture comprising
(a) from 15 to 40% by weight of at least one (meth)acrylate and/or (meth)acrylamide having in each case one free amino group, protonated amino group and/or quaternized amino group,
(b) from 40 to 70% by weight of at least one optionally substituted styrene,
(c) from 0 to 25% by weight of acrylonitrile and/or methacrylonitrile,
(d) from 0.5 to 5% by weight of at least one ethylenically unsaturated monomer comprising acid groups, of an ethylenically unsaturated carboxylic acid or of a carboxylic anhydride and
(e) from 0 to 30% by weight of at least one nonionic, ethylenically unsaturated monomer differing from (b) and (c), the sum of (a)+(b)+(c)+(d)+(e) being 100% by weight, by a solution polymerization method in an organic solvent partly to completely miscible with water.

Prepolymers which are prepared in the first polymerization stage from a monomer mixture comprising
(a) dimethylaminopropylmethacrylamide in the form of the salt with at least one mineral acid or an organic acid and/or in quaternized form,
(b) styrene,
(c) acrylonitrile and/or methacrylonitrile,
(d) acrylic acid and/or methacrylic acid and
(e) n-butyl acrylate, isobutyl acrylate and/or tert-butyl acrylate are particularly preferred. A monomer mixture comprising
(a) from 30 to 70% by weight of styrene and
(b) from 70 to 30% by weight of a mixture of n-butyl acrylate and tert-butyl acrylate in the weight ratio of from 3:1 to 1:3 or
(c) from 70 to 30% by weight of tert-butyl acrylate or n-butyl acrylate is preferably used for the emulsion polymerization in the second process stage. Instead of a mixture of n-butyl acrylate and tert-butyl acrylate, it is also possible to copolymerize n-butyl acrylate or tert-butyl acrylate in each case by itself with styrene.

For the preparation of the prepolymer, at least one cationic or basic (meth)acrylate and/or at least one cationic or basic (meth)acrylamide having in each case one free amino group, protonated amino group and/or quaternized amino group as its substituent are used as monomers of group (a). The monomers of group (a), which carry an amino group as a substituent, an be characterized, for example, with the aid of the formula (I):

The low molecular weight prepolymer which is prepared in the first polymerization stage comprises, as component (a), at least one nitrogen-containing monomer which carries an amino and/or quaternary amino group. Compounds of this type have the general formula

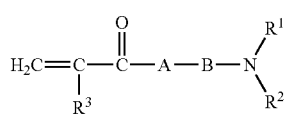

where

A is O is or NH,

B is $C_nH_{2n}$, where n is 1 to 8, $R^1$ and $R^2$ are $C_mH_{2m+1}$, where m is 1 to 4 and $R^3$ is H or $CH_3$.

The quaternized compounds can be characterized with the aid of the following formula

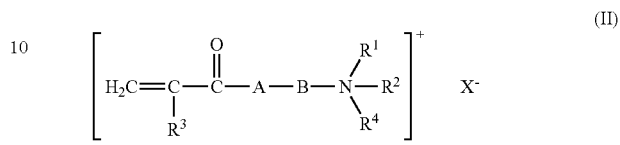

$X^-=OH^-$, $Cl^-$, $Br^-$, $CH_3-OSO_3^-$ $R^4=C_mH_{2m+1}$, m=1 to 4.

The other substituents have the abovementioned meaning.

The compounds of the formula II are as a rule defined as cationic monomers, and those of the formula I as basic monomers. Basic, ethylenically unsaturated monomers are, for example, esters of acrylic acid and methacrylic acid with aminoalcohols, e.g. diethylaminoethyl acrylate, diethylaminoethyl methacrylate, dimethylaminopropyl acrylate, dimethylaminopropyl methacrylate, dibutylaminopropyl acrylate, dibutylaminopropyl methacrylate, dimethylaminoneopentyl acrylate, derivatives of acrylamide or of methacrylamide which contain amino groups, such as acrylamidodimethylpropylamine, methacrylamidodimethylpropylamine and methacrylamidodimethylpropyamine.

The quaternary compounds of the formula II are obtained by reacting the basic monomers of the formula I with known quaternizing agents, for example with methyl chloride, benzyl chloride, ethyl chloride, butyl bromide, dimethyl sulfate and diethyl sulfate or epichlorohydrin. These monomers lose their basic character in the quaternized form.

Dimethylaminopropylmethacrylamide in the form of the salt with at least one mineral acid or carboxylic acid and/or in quaternized form is preferably used as a monomer of group (a). A preferred quaternizing agent is methyl chloride.

The monomers of group (a) are used in the preparation of the prepolymer in an amount of from 15 to 40% by weight, preferably from 20 to 35% by weight, based on the monomer mixture (a) to (e). The sum of the data in % by weight for the monomers (a) to (e) is always 100.

For the preparation of the prepolymer, styrene and substituted styrenes, such as α-methylstyrene or ethylstyrene, are used as monomers of group (b). The monomers of group (b) are present in the monomer mixture of (a) to (e) in an amount of from 40 to 70% by weight, preferably from 45 to 60% by weight.

Suitable monomers of group (c) are acrylonitrile, methacrylonitrile and mixtures of acrylonitrile and methacrylonitrile in any desired ratios. Acrylonitrile is preferably used as monomer (c). The monomers of group (c) are optionally present in the monomer mixture in the preparation of the prepolymer. They are used, if appropriate, in an amount of up to 25% by weight, based on the sum of the monomers (a) to (e). In a preferred embodiment of the invention, the monomers of this group are present in the monomer mixture in an amount of from 5 to 20% by weight.

Examples of monomers of group (d) are ethylenically unsaturated $C_3$- to $C_6$-carboxylic acids, such as acrylic acid, methacrylic acid, maleic acid, fumaric acids itaconic acids ethacrylic acid and crotonic acid, monoesters of ethylenically unsaturated dicarboxylic acids, such as monomethyl maleate, monomethyl fumarate, monoethyl maleate, monoethyl fumarate, monopropyl maleate, monopropyl fumarate, mono-n-butyl maleate and mono-n-butyl fumarate, and styrenecarboxylic acids and ethylenically unsaturated anhydrides, such as maleic anhydride and itaconic anhydride. Depending on the water content of the solvent used in the first polymerization stage, the anhydride groups of the monomers are hydrolyzed to carboxyl groups. In any case, the anhydride groups are hydrolyzed before the second polymerization stage if in fact the polymer solution obtained in the first polymerization stage is diluted with water. Moreover, monomers comprising sulfo and phosphonic acid groups, such as 2-acrylamido-2-methylpropanesulfonic acid and vinylphosphonic acid, are suitable as monomers (d). The monomers comprising acid groups can be used in the form of the free acid groups and in a form partly or completely neutralized with alkali metal bases, alkaline earth metal bases, ammonia and/or amines. For example, sodium hydroxide solution, potassium hydroxide solution, sodium carbonate, sodium bicarbonate, ammonia, trimethylamine, triethylamine, morpholine, ethanolamine, diethanolamine, triethanolamine or diethylenetriamine is used for neutralizing the acid groups of the monomers. It is of course possible to use two or more bases as neutralizing agents. From this monomer group, acrylic acid and methacrylic acid or mixtures of acrylic acid and methacrylic acid in any desired ratio are preferably used. The monomers of group (d) are present in the monomer mixture of (a) to (e) in an amount of from 0.5 to 5% by weight, preferably from 0.7 to 3.5% by weight.

The monomer mixtures used for the preparation of the prepolymer can, if appropriate, comprise nonionic, ethylenically unsaturated monomers (e) which differ from the monomers (b) and (c). Examples of such monomers are amides, such as, for example, acrylamide, methacrylamide, N-methylacrylamide, N-methylolacrylamide, N-ethylacrylamide, N-ethylmethacrylamide and N-methylmethacrylamide; vinyl compounds, such as vinyl acetate, vinyl propionate or vinylformamide; $C_1$- to $C_{18}$-(meth)acrylates, such as, for example, methyl acrylate, methyl methacrylate, ethyl acrylate, ethyl methacrylate, propyl acrylate, propyl methacrylate, isopropyl acrylate, n-butyl, isobutyl and tert-butyl acrylate, n-butyl, isobutyl and tert-butyl methacrylate, hexyl acrylate, hexyl methacrylate, ethylhexyl acrylate, ethylhexyl methacrylate, cyclohexyl acrylate, cyclohexyl methacrylate, n-decyl acrylate, lauryl acrylate, stearyl acrylate, stearyl methacrylate or esters of acrylic acid or methacrylic acid which were prepared by reacting at least one ethylene oxide unit, for example hydroxyethyl methacrylate or diethylene glycol monomethacrylate. It is of course possible also to use mixtures of said monomers. If the monomers of group (e) are used, they are present in the monomer mixture in an amount of up to 30% by weight, in general in an amount of up to 15% by weight, based on the total amount of the monomers (a) to (e).

In the first polymerization stage, the monomers (a) to (e) are polymerized by a solution polymerization method in a solvent which is partly to completely miscible with water and may comprise up to 15% by weight of water. Virtually anhydrous solvents are preferably used. The solvents generally comprise up to about 1% by weight of water. Examples of suitable solvents are $C_1$- to $C_3$-carboxylic acids, such as formic acid, acetic acid and propionic acid, alcohols, such as methanol, ethanol, propanol and isopropanol, ketones, such as acetone and methyl ethyl ketone, amides, such as dimethylformamide, and dimethyl sulfoxide, carbonates, such as propylene carbonate and ethylene carbonate, and tetrahydrofuran. If solvents free of acid groups are used, the monomers (d) containing acid groups are preferably neutralized before the polymerization. In the first polymerization stage, anhydrous formic acid or anhydrous acetic acid is preferably used. The other reactants are then preferably likewise used in anhydrous form.

The solution polymerization in the first polymerization stage is effected in the presence of initiators which form free radicals under the polymerization conditions, at temperatures in the range from 20 to 160° C., preferably from 60 to 120° C. If the polymerization temperature should be above the boiling point of the solvent used, the polymerization is carried out under superatmospheric pressure, for example in an autoclave equipped with a stirrer. Initiators which dissolve in the organic, water-miscible solvent, for example azobisisobutyronitrile, tert-butyl peroctanoate, tert-butyl perbenzoate, benzoyl peroxide, tert-butyl perpivalate, lauroyl peroxide, di-tert-butyl peroxide, tert-butyl hydroperoxide and hydrogen peroxide, if appropriate in the presence of heavy metal cations are preferably used.

The polymerization in the first stage can, if appropriate, be carried out in the presence of regulators. Suitable regulators are, for example, mercaptans, such as ethyl mercaptan, n-butyl mercaptan, tert-butyl mercaptan, n-dodecyl mercaptan or tert-dodecyl mercaptan, thioglycolic acid, terpinols or carbon tetrabromide. If polymerization regulators are used, the amounts of regulator are, for example, from 0.1 to 15% by weight. The polymers prepared in the first stage have a relatively low molar mass, e.g. $M_w$ from 1000 to 100 000, preferably from 5000 to 50 000 (determined by light scattering). The determination of the molecular weight distribution and of the mass average molecular weight can be carried out by methods known to a person skilled in the art, such as, for example, gel permeation chromatography, light scattering or ultracentrifuging.

In the first polymerization stage, the monomers are used in relation to the solvent in an amount such that polymer solutions having a polymer content of from 15 to 70% by weight, preferably from 30 to 65% by weight, are obtained. The polymers are preferably soluble to give a clear solution in the organic solvent partly to completely miscible with water. The solution polymers prepared in the first stage are used as dispersant/protective colloid or possibly as seed for the subsequent emulsion polymerization. For this purpose, it is necessary to add water to the solution of the prepolymer or to introduce the polymer solution into water. An aqueous polymer solution which may also comprise disperse fractions (colloidal solution), from which the organic solvent partly to completely miscible with water can, if appropriate, be distilled off, is obtained. The concentration of the solution polymer prepared in the first polymerization stage in the polymer solution to which water has been added is, for example, from 2 to 35, preferably from 15 to 25, % by weight. The prepolymer solution to which water has been added is then used in the second stage of the polymerization as an initially taken mixture or emulsifier/protective colloid or possibly as seed for the emulsion polymerization. In the second stage of the polymerization, from 0.1 to 10, preferably from 0.8 to 3, parts by weight, based on 1 part by weight of the prepolymer, of at least one nonionic, ethylenically unsaturated monomer are used.

Examples of nonionic, ethylenically unsaturated monomers which are subjected to the emulsion polymerization in the second stage are styrene, substituted styrenes, such as α-methylstyrene, $C_1$- to $C_{22}$-(meth)acylates, such as, in particular, methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, tert-butyl acrylate, isobutyl methacrylate, n-butyl methacrylate, tert-butyl methacrylate, hexyl acrylate, hexyl methacrylate, ethylhexyl acrylate, ethylhexyl methacrylate, cyclohexyl acrylate, cyclohexyl methacrylate, n-decyl acrylate, lauryl acrylate, stearyl acrylate and stearyl methacrylate, acrylonitrile, methacrylonitrile, amides, such as acrylamide, methacrylamide or n-methylolacrylamide, vinylformamide, vinyl acetate, vinyl propionate, vinyl ethyl ether and vinyl tert-butyl ether, dienes, such as butadiene or isoprene, and esters of acrylic acid or methacrylic acid which were prepared by reaction with at least one ethylene oxide unit, such as hydroxyethyl methacrylate or diethylene glycol monomethacrylate. In the second polymerization stage, a monomer mixture comprising (a) from 30 to 70% by weight of styrene and
(b) from 70 to 30% by weight of a mixture of n-butyl acrylate and tert-butyl acrylate in the weight ratio of from 3:1 to 1:3 or
(c) from 70 to 30% by weight of tert-butyl acrylate or n-butyl acrylate is preferably subjected to the emulsion polymerization. Instead of a mixture of n-butyl acrylate and tert-butyl acrylate, it is also possible to copolymerize n-butyl acrylate or tert-butyl acrylate in each case by itself with styrene.

The present invention also relates to a process for the preparation of the finely divided, amphoteric, aqueous polymer dispersions described above, a prepolymer being prepared in the first polymerization stage from a monomer mixture comprising (a) from 15 to 40% by weight of at least one (meth)acrylate and/or (meth)acrylamide having in each case a free amino group, ammonium group and/or quaternary amino group,
(b) from 40 to 70% by weight of at least one optionally substituted styrene,
(c) from 0 to 25% by weight of acrylonitrile and/or methacrylonitrile,
(d) from 0.5 to 5% by weight of at least one ethylenically unsaturated monomer comprising acid groups and
(e) from 0 to 30% by weight of at least one nonionic, ethylenically unsaturated monomer differing from (b) and (c), the sum of (a)+(b)+(c)+(d)+(e) being 100% by weight, in a solution polymerization in a solvent partly to completely miscible with water, then adding water to the solution/dispersion of the prepolymer and then subjecting at least one nonionic, ethylenically unsaturated monomer to an emulsion polymerization in the aqueous solution of the prepolymer in a second polymerization stage.

The emulsion polymerization is generally effected in the temperature range from 40 to 150° C., preferably from 60 to 90° C., in the presence of conventional amounts of preferably water-soluble polymerization initiators. In general, from 0.2 to 4, preferably from 0.5 to 2, % by weight, based on the monomers to be polymerized, of at least one initiator are used. Suitable initiators are, for example, azo compounds, peroxides, hydroperoxides, hydrogen peroxide, inorganic peroxides and redox systems, such as combinations of hydrogen peroxide and ascorbic acid or tert-butyl hydroperoxide and ascorbic acid. The redox systems can moreover comprise heavy metal cations, such as cerium, manganese or iron(II) ions for activation.

In the emulsion polymerization, either the monomers can be metered directly into the initially taken mixture or they can be fed in the form of an aqueous emulsion or miniemulsion to the polymerization batch. In order to emulsify the monomers in water, for example, a part of the prepolymer diluted with water and obtained from the first polymerization stage can be used as an emulsifier, or the monomers are emulsified with the aid of conventional nonionic, anionic, cationic or amphoteric emulsifiers in water. Conventional emulsifiers are only used if appropriate. The amounts used are, for example, from 0.05 to 3% by weight and are preferably in the range from 0.5 to 2% by weight. Conventional emulsifiers are described in detail in the literature, cf., for example, M. Ash, I. Ash, Handbook of Industrial Surfactants, Third Edition, Synapse Information Resources, Inc. Examples of conventional emulsifiers are the reaction products of long-chain monohydric alcohols ($C_{10}$- to $C_{22}$-alkanols) with from 4 to 50 mol of ethylene oxide and/or propylene oxide per mole of alcohol or ethoxylated phenols or alkoxylated alcohols esterified with sulfuric acid, which are generally used in a form neutralized with alkali metal hydroxide solutions. Further conventional emulsifiers are, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts.

The metering of the monomers for carrying out the emulsion polymerization can be effected continuously or batchwise. When a monomer mixture is used, the metering of the monomers can be effected as a mixture or separately or by a step or gradient procedure. The addition can be effected uniformly or nonuniformly over the metering period, i.e. with changing metering rate. By adding a portion of the monomer to the initially taken mixture containing the aqueous solution/dispersion of the prepolymer, the metering is possible by means of a swelling procedure. Of course, suitable regulators, such as, for example, mercaptans, such as ethyl mercaptan, n-butyl mercaptan, tert-butyl mercaptan, n-dodecyl mercaptan or tert-dodecyl mercaptan, thioglycolic acid, terpinols or carbon tetrabromide, can be used for molar mass regulation during the emulsion polymerization. With the use of a regulator, amounts of from 0 to 5% by weight, based on the total amount of monomers, of regulator are preferably used.

In the second polymerization stage, the pH of the reaction mixture is, for example, in the range from 1 to 5, in general from 2 to 4. The polymer concentration of the aqueous dispersions obtained in the emulsion polymerization is, for example, from 15 to 45, preferably from 25 to 35, % by weight.

In the second polymerization stage, finely divided, aqueous polymer dispersions which, owing to the composition of the prepolymer, have amphoteric properties are obtained. The mean particle size of the dispersed particles is, for example, from 5 to 250 nm, preferably <100 nm, particularly preferably from 10 to 60 nm. The mean particle size can be determined by methods known to a person skilled in the art, such as, for example, laser correlation spectroscopy, ultracentrifuging or CHDF. A further measure of the particle size of the dispersed polymer particles is the LT value. For determining the LT value (light transmittance), the polymer dispersion to be investigated in each case is measured in 0.1% strength by weight aqueous formulation in a cell having an edge length of 2.5 cm using light of 600 nm wavelength. From the measured values, it is possible to calculate the mean particle size, cf. B. Verner, M. Bárta, B. Sedlácek, Tables of Scattering Functions for Spherical Particles, Prague 1976, Edice Marco, Rada D-DATA, SVAZEK D-1.

The finely divided, amphoteric aqueous polymer dispersions described above are used as sizes for paper, board and cardboard. They are suitable in particular for the surface sizing of paper products but can also be used for engine sizing. For the application as size, the aqueous polymer dispersions are diluted by adding water, in general to a polymer content of, for example, from 0.05 to 3% by weight. Such preparation solutions can, if appropriate, comprise further substances, for example starch, dyes, optical brighteners, biocides, strength agents for paper, fixing agents, antifoams, retention aids and/or drainage aids.

Unless evident otherwise from the context, the stated percentages in the examples are percent by weight.

EXAMPLE 1

101.4 g of anhydrous acetic acid (glacial acetic acid) were initially taken in a 2 l flask which had a plane ground joint and was equipped with a stirrer and an internal temperature measuring means and were heated to 105° C. under a nitrogen atmosphere. A mixture of 125.0 g of styrene, 25.0 g of acrylonitrile, 55.0 g of N,N-dimethylaminopropylmethacrylamide, 5.0 g of acrylic acid and 5.0 g of n-butyl acrylate was metered in uniformly over a period of 45 min while stirring. The feed of 8.8 g of tert-butyl peroctanoate in 16.5 g of isopropanol was started simultaneously with the monomer feed and was metered into the reaction mixture in the course of 60 min. After the end of the initiator feed, the reaction mixture was stirred for a further 30 min at a temperature of 105° C.

975 g of demineralized water were then added to the homogeneous polymer material at 85° C. in the course of 30 min. After addition of 0.75 g of 10% strength iron(II) sulfate solution, 20 g of a 5% strength hydrogen peroxide solution were metered in the course of 30 min. A mixture of 142.5 g of styrene, 71.3 g of n-butyl acrylate and 71.3 g of tert-butyl acrylate was then metered in uniformly at 85° C. over a period of 120 min. Simultaneously with the monomer feed, a separate feed of 80.0 g of a 5% strength hydrogen peroxide solution was metered in over 150 min. After the end of the addition, stirring was effected for a further 60 min at 85° C. and the reaction mixture was then cooled to 50° C. For subsequent activation, 11.3 g of Rongalit® C (adduct of formaldehyde with sodium bisulfite) were added and stirring was again effected for 30 min at 50° C.

A finely divided polymer dispersion having a solids content of 29.3% and an LT value (0.1%) of 89.6% was obtained.

EXAMPLE 2

101.4 g of glacial acetic acid were initially taken in a 2 l flask which had a plane ground joint and was equipped with a stirrer and an internal temperature measuring means and were heated to 105° C. under a nitrogen atmosphere. A mixture of 110.5 g of styrene, 22.1 g of acrylonitrile, 48.6 g of N,N-dimethylaminopropylmethacrylamide, 4.4 g of acrylic acid and 4.4 g of n-butyl acrylate was metered in uniformly over a period of 45 min while stirring. The feed of 8.8 g of tert-butyl peroctanoate in 16.5 g of isopropanol was started simultaneously with the monomer feed and was metered into the reaction mixture in the course of 60 min. After the end of the initiator feed, the reaction mixture was stirred for a further 30 min at a temperature of 105° C.

975 g of demineralized water were then added to the homogeneous polymer material at 85° C. in the course of 30 min. After addition of 0.75 g of 10% strength iron(II) sulfate solution, 20 g of a 5% strength hydrogen peroxide solution were metered in the course of 30 min. A mixture of 155.0 g of styrene and 155.0 g of tert-butyl acrylate was then metered in uniformly at 85° C. over a period of 120 min. Simultaneously with the monomer feed, a separate feed of 80.0 g of a 5% strength hydrogen peroxide solution was metered in over 150 min. After the end of the addition, stirring was effected for a further 60 min at 85° C. and the reaction mixture was then cooled to 50° C. For subsequent activation, 11.3 g of Rongalit® C were added and stirring was again effected for 30 min at 50° C.

A finely divided polymer dispersion having a solids content of 29.2% and an LT value (0.1%) of 89% was obtained.

EXAMPLE 3

Example 1 was repeated with the only exception that, in the second stage, the emulsion polymerization, a monomer mixture comprising 142.5 g of styrene and 142.5 g of tert-butyl acrylate was used. A finely divided polymer dispersion having a solids content of 29.5% and an LT value (0.1%) of 90% was obtained.

EXAMPLE 4

101.4 g of glacial acetic acid were initially taken in a 2 l flask which had a plane ground joint and was equipped with a stirrer and an internal temperature measuring means and were heated to 105° C. under a nitrogen atmosphere. A mixture of 133.0 g of styrene, 57.0 g of N,N-dimethylaminopropylmethacrylamide and 5.0 g of methacrylic acid was metered in uniformly over a period of 45 min while stirring. The feed of 83 g of tert-butyl peroctanoate in 17.5 g of isopropanol was started simultaneously with the monomer feed and was metered into the reaction mixture in the course of 60 min. After the end of the initiator feed, the reaction mixture was stirred for a further 30 min at a temperature of 105° C.

975 g of demineralized water were then added to the homogeneous polymer material at 85° C. in the course of 30 min. After addition of 0.75 g of 10% strength iron(II) sulfate solution, 20 g of a 5% strength hydrogen peroxide solution were metered in the course of 30 min. A mixture of 152.5 g of styrene and 152.5 g of tert-butyl acrylate was then metered in uniformly at 85° C. over a period of 120 min. Simultaneously with the monomer feed, a separate feed of 80.0 g of a 5% strength hydrogen peroxide solution was metered in over 150 min. After the end of the addition, stirring was effected for a further 60 min at 85° C. and the reaction mixture was then cooled to 70° C. For subsequent activation, 11.3 g of Rongalit® C were added and stirring was effected again for 30 min at 70° C.

A finely divided polymer dispersion having a solids content of 29.3% and an LT value (0.1%) of 89% was obtained.

EXAMPLE 5

101.4 g of glacial acetic acid were additionally taken in a 2 l flask which had a plane ground joint and was equipped with a stirrer and an internal temperature measuring means and were heated to 105° C. under a nitrogen atmosphere. A mixture of 112.5 g of sytrene, 25.0 g of acrylonitrile, 72.5 g of N,N-dimethylaminoethyl acrylate and 5.0 g of acrylic acid was metered in uniformly over a period of 45 min while stirring. The feed of 8.8 g of tert-butyl peroctanoate in 16.5 g of isopropanol was started simultaneously with the monomer feed and was metered into the reaction mixture in the course of 60 min. After the end of the initiator feed, the reaction mixture was stirred for a further 30 min at a temperature of 105° C.

962 g of demineralized water were then added to the homogeneous polymer material at 85° C. in the course of 30 min. After addition of 7.5 g of 1% strength iron(II) sulfate solution, 20 g of a 5% strength hydrogen peroxide solution were metered in the course of 30 min. A mixture of 142.5 g of styrene and 142.5 g of tert-butyl acrylate was then metered in uniformly at 85° C. over a period of 120 min. Simultaneously with the monomer feed, a separate feed of 80.0 g of a 5% strength hydrogen peroxide solution was metered in over 150 min. After the end of the addition, stirring was effected for a further 60 min at 85° C. and the reaction mixture was then cooled.

A finely divided polymer dispersion having a solids content of 28.9% and an LT value (0.1%) of 85% was obtained.

EXAMPLE 6

101.4 g of glacial acetic acid were additionally taken in a 2 l flask which had a plane ground joint and was equipped with a stirrer and an internal temperature measuring means and were heated to 105° C. under a nitrogen atmosphere. A mixture of 133.0 g of sytrene, 57.0 g of N,N-dimethylaminoethyl methacrylate and 5.0 g of acrylic acid was metered in uniformly over a period of 45 min while stirring. The feed of 8.8 g of tert-butyl peroctanoate in 18.2 g of isopropanol was started simultaneously with the monomer feed and was metered into the reaction mixture in the course of 60 min. After the end of the initiator feed, the reaction mixture was stirred for a further 30 min at a temperature of 105° C.

971.5 g of demineralized water were then added to the homogeneous polymer material at 60° C. in the course of 30 min. After addition of 7.5 g of 1% strength iron(II) sulfate solution and 5.0 g of a 10% strength aqueous ascorbic acid solution, 20 g of a 5% strength hydrogen peroxide solution were metered in the course of 30 min. A mixture of 119.2 g of styrene and 119.2 g of tert-butyl acrylate was then metered in uniformly at 60° C. over a period of 120 min. Simultaneously with the monomer feed, a separate feed of 80.0 g of a 5% strength hydrogen peroxide solution was metered in over 150 min. After the end of the addition, stirring was effected for a further 60 min at 60° C. and the reaction mixture was then cooled.

A finely divided polymer dispersion having a solids content of 26.0% and an LT value (0.1%) of 86% was obtained.

EXAMPLE 7

101.7 g of glacial acetic acid were additionally taken in a 2 l flask which had a plane ground joint and was equipped with a stirrer and an internal temperature measuring means and were heated to 105° C. under a nitrogen atmosphere. A mixture of 133.0 g of sytrene, 47.0 g of N,N-dimethylaminoethyl acrylate, 10.0% of N,N-dimethylamino-propylmethacrylamide and 5.0 g of acrylic acid was metered in uniformly over a period of 45 min while stirring. The feed of 8.8 g of tert-butyl peroctanoate in 18.2 g of isopropanol was started simultaneously with the monomer feed and was metered into the reaction mixture in the course of 60 min. After the end of the initiator feed, the reaction mixture was stirred for a further 30 min at a temperature of 105° C.

955.1 g of demineralized water were then added to the homogeneous polymer material at 60° C. in the course of 30 min. After addition of 7.5 g of 1% strength iron(II) sulfate solution and 5.0 g of a 10% strength aqueous ascorbic acid solution, 20 g of a 5% strength hydrogen peroxide solution were metered in the course of 30 min. A mixture of 152.5 g of styrene and 152.5 g of tert-butyl acrylate was then metered in uniformly at 60° C. over a period of 120 min. Simultaneously with the monomer feed, a separate feed of 80.0 g of a 5% strength hydrogen peroxide solution was metered in over 150 min. After the end of the addition, stirring was effected for a further 60 min at 60° C. and the reaction mixture was then cooled.

A finely divided polymer dispersion having a solids content of 28.7% and an LT value (0.1%) of 91% was obtained.

EXAMPLE 8

101.7 g of glacial acetic acid were additionally taken in a 2 l flask which had a plane ground joint and was equipped with a stirrer and an internal temperature measuring means and were heated to 105° C. under a nitrogen atmosphere. A mixture of 133.0 g of sytrene, 57.0 g of N,N-dimethylaminoethyl acrylate and 5.0 g of acrylic acid was metered in uniformly over a period of 45 min while stirring. The feed of 8.8 g of tert-butyl peroctanoate in 18.2 g of isopropanol was started simultaneously with the monomer feed and was metered into the reaction mixture in the course of 60 min. After the end of the initiator feed, the reaction mixture was stirred for a further 30 min at a temperature of 105° C.

800.0 g of demineralized water were then added to the homogeneous polymer material at 85° C. in the course of 30 min. After addition of 7.5 g of 1% strength iron(II) sulfate solution and 5.0 g of a 10% strength aqueous ascorbic acid solution, 20 g of a 5% strength hydrogen peroxide solution were metered in the course of 30 min. A mixture of 119.2 g of styrene and 119.2 g of tert-butyl acrylate was then metered in uniformly at 85° C. over a period of 120 min. Simultaneously with the monomer feed, a separate feed of 80.0 g of a 5% strength hydrogen peroxide solution was metered in over 150 min. After the end of the addition, stirring was effected for a further 60 min at 85° C. and the reaction mixture was then cooled.

A finely divided polymer dispersion having a solids content of 29.1% and an LT value (0.1%) of 43% was obtained.

COMPARATIVE EXAMPLE 1 ACCORDING TO EP-A-0 051 144

In a 2 l flask which had a plane ground joint and was equipped with a stirrer and an internal temperature measurement means, 60 g of glacial acetic acid, 60 g of styrene, 33 g of N,N-dimethylaminopropylmethacrylamide, 15 g of acrylic acid and 1 g of azobisisobutyronitrile were mixed under a nitrogen atmosphere and heated to 85° C. while stirring, and stirring was effected for a further 30 min at this temperature. At the same temperature, 1.25 g of azobisisobutyronitrile, dissolved in 5 g of acetone, were then metered in over a period of 60 min. After the end of the addition, polymerization was effected again for 30 min at 105° C.

590 g of demineralized water were then added at 85° C. to the homogeneous polymer solution obtained, with the result that a homogeneous, slightly turbid solution was obtained. After addition of 20 g of a 6% strength hydrogen peroxide solution and 1.2 g of a 10% strength iron(II) sulfate solution, 80 g of a 6% strength hydrogen peroxide solution and a mixture of 66 g of styrene and 126 g of isobutyl acrylate were metered in separately and uniformly over a period of 120 min while stirring at a temperature of 85° C. After the end of the addition, polymerization was continued for 60 min at the same temperature.

A finely divided polymer dispersion having a solids content of 28.4% and an LT value (0.1%) of 66% was obtained.

COMPARATIVE EXAMPLE 2 ACCORDING TO EP-A-1 180 527

A mixture of 105.4 g of styrene, 40.0 g of N,N-dimethylaminopropylmethacrylamide, 0.8 g of tert-dodecyl mercaptan (95%) and 117.8 g of glacial acetic acid were initially taken at room temperature in a 2 l flask which had a plane ground joint and was equipped with a stirrer and an internal temperature measuring means and was heated to 95° C. under a nitrogen atmosphere while stirring. After the reaction temperature had been reached, a solution of 2.0 g of azobisisobutyronitrile in 13.4 g of acetone was then metered uniformly into the reaction solution over a period of 120 min while stirring. The batch was then stirred for a further 120 min at 95° C. and then cooled.

1260 g of demineralized water were added to the prepolymer at room temperature while stirring. The mixture was heated to 85° C. under a nitrogen atmosphere and with continued stirring. A homogeneous, slightly turbid liquid phase was obtained. After the reaction temperature had been reached, the initially taken mixture was stirred further for 15 min and then 20.0 g of a 1% strength iron(II) sulfate solution were added. Thereafter, a mixture of 129.5 g of styrene and 92.5 g of n-butyl acrylate, and 64.8 g of a 3% strength hydrogen peroxide solution, were metered into the reaction solution simultaneously over 90 min at a constant metering rate from separate feeds while the temperature was kept constant. After the end of the feeds, the batch was stirred for a further 15 min at 85° C. and then 2.3 g of tert-butyl hydroperoxide (70%) were added for subsequent activation. After a subsequent stirring time of 60 min at 85° C., the batch was cooled and aqueous Trilon® B solution (wetting agent) was added at room temperature.

A finely divided polymer dispersion having a solids content of 19.7% and an LT value (0.1%) of 66% was obtained.

Testing of performance characteristics of the polymer dispersions obtained according to the examples and the comparative examples For testing the performance characteristics with regard to the surface sizing effect, the dispersions according to the invention and the comparative dispersions were applied by means of a laboratory size press to the test paper (100% wastepaper, 80 g/m² mass per unit area, unsized). An oxidized potato starch (Emox TSC) was dissolved in water by heating to 95° C. and then brought to the desired concentration. The dispersions to be tested were then metered into the starch solution so that the size press liquor comprised 80 g/l of an oxidized, dissolved potato starch (Emox TSC) and 0.1-1.5 g/l of the dispersions.

The sizing effect of the dispersions which were obtained according to examples 1-4 and comparative examples 1 and 2 was then determined by surface application to the unsized test paper. For this purpose, the paper was passed twice through the size press, an increase in the weight by about 65% being achieved on average.

The drying of the surface-sized papers was effected on a drying cylinder at 90° C. The papers were then stored overnight in a conditioned room (23° C., 50% relative humidity) before the degree of sizing was determined.

For determining the degree of sizing of the surface-sized papers, the $Cobb_{60}$ value and the $Cobb_{120}$ value were determined according to DIN 53 132. The $Cobb_{60}$ value is defined as the water absorption of the paper sheet in g/m² after contact with water and a contact time of 60 s (or 120 s in the case of the $Cobb_{120}$ value). The lower the Cobb value, the better the sizing effect of the dispersion used. The test results are shown in the table.

TABLE

| | $Cobb_{60}$ value [g/m²] | | $Cobb_{120}$ value [g/m²] |
|---|---|---|---|
| Amount applied [g/l] | 1.0 | 1.5 | 1.0 |
| Example 1 | 24 | 23 | 32 |
| Example 2 | 25 | 23 | 37 |
| Example 3 | 25 | 22 | 36 |
| Example 4 | 25 | 22 | 33 |
| Example 5 | 26 | 25 | 48 |
| Example 6 | 25 | 23 | 38 |
| Example 7 | 24 | 23 | 39 |
| Example 8 | 23 | 22 | 40 |
| Comparative example 1 | 27 | 26 | 53 |
| Comparative example 2 | 68 | 31 | 103 |

We claim:

1. A finely divided, amphoteric, aqueous polymer dispersion which is obtained by a two-stage polymerization, a prepolymer being prepared in the first polymerization stage from a monomer mixture comprising
    (a) from 15 to 40% by weight of at least one (meth)acrylate and/or (meth)acrylamide having in each case a free amino group, protonated amino group and/or quaternized amino group,
    (b) from 40 to 70% by weight of at least one optionally substituted styrene,
    (c) from 0 to 25% by weight of acrylonitrile and/or methacrylonitrile,
    (d) from 0.5 to 5% by weight of at least one ethylenically unsaturated monomer comprising acid groups and
    (e) from 0 to 30% by weight of at least one nonionic, ethylenically unsaturated monomer differing from (b) and (c), the sum of (a)+(b)+(c)+(d)+(e) being 100% by weight,
in a solution polymerization in a solvent partly to completely miscible with water, water then being added to the solution/dispersion of the prepolymer and then at least one nonionic, ethylenically unsaturated monomer being subjected to an emulsion polymerization in the aqueous solution of the prepolymer in a second polymerization stage.

2. The finely divided, amphoteric, aqueous polymer dispersion according to claim 1, wherein, in the second polymerization stage, an emulsion polymer consisting of a monomer mixture comprising
    (a) from 0 to 80% by weight of at least one optionally substituted styrene,
    (b) from 0 to 100% by weight of at least one C1- to C18-(meth)acrylate and
    (c) from 0 to 30% by weight of at least one nonionic ethylenically unsaturated monomer differing from (a) and (b), the sum of (a)+(b)+(c) being 100% by weight, is polymerized in the presence of initiators.

3. The finely divided, amphoteric, aqueous polymer dispersion as claimed in claim 1, wherein, in the first polymerization stage, a prepolymer is prepared from a monomer mixture comprising
    (a) from 15 to 40% by weight of at least one (meth)acrylate and/or (meth)acrylamide having in each case one free amino group, protonated amino group and/or quaternized amino group,
    (b) from 40 to 70% by weight of at least one optionally substituted styrene,
    (c) from 5 to 25% by weight of acrylonitrile and/or methacrylonitrile, (d) from 0.5 to 5% by weight of at least one ethylenically unsaturated carboxylic acid or of a carboxylic anhydride and
(e) from 0 to 30% by weight of at least one nonionic, ethylenically unsaturated monomer differing from (b) and (c),
the sum of (a)+(b)+(c)+(d)+(e) being 100% by weight, by a solution polymerization method in an organic solvent partly to completely miscible with water.

4. The finely divided, amphoteric aqueous polymer dispersion according to claim 1, wherein, in the first polymerization stage, a prepolymer is prepared from a monomer mixture comprising
    (a) dimethylaminopropylmethacrylamide in the form of a salt with at least one mineral acid or carboxylic acid and/or in quaternized form,
    (b) styrene,
    (c) acrylonitrile and/or methacrylonitrile,
    (d) acrylic acid and/or methacrylic acid and
    (e) n-butyl acrylate, isobutyl acrylate and/or tert-butyl acrylate.

5. The finely divided, amphoteric, aqueous polymer dispersion according to claim 1, wherein, in the second polymerization stage, a monomer mixture comprising
    (a) from 30 to 70% by weight of styrene and
    (b) from 70 to 30% by weight of a mixture of n-butyl acrylate and tert-butyl acrylate in the weight ratio of from 3:1 to 1:3 or
    (c) from 70 to 30% by weight of tert-butyl acrylate or n-butyl acrylate
is subjected to the emulsion polymerization.

6. A process for the preparation of the finely divided, amphoteric, aqueous polymer dispersions according to claim 1 by a two-stage polymerization, wherein a prepolymer is prepared in the first polymerization stage from a monomer mixture comprising
    (a) from 15 to 40% by weight of at least one (meth)acrylate and/or (meth)acrylamide having in each case a free amino group, ammonium group and/or quaternary amino group,
    (b) from 40 to 70% by weight of at least one optionally substituted styrene,
    (c) from 0 to 25% by weight of acrylonitrile and/or methacrylonitrile,
    (d) from 0.5 to 5% by weight of at least one ethylenically unsaturated monomer comprising acid groups and
    (e) from 0 to 30% by weight of at least one nonionic, ethylenically unsaturated monomer differing from (b) and (c),
the sum of (a)+(b)+(c)+(d)+(e) being 100% by weight,
in a solution polymerization in a solvent partly to completely miscible with water, water is then added to the solution of the prepolymer and then at least one nonionic, ethylenically unsaturated monomer is subjected to an emulsion polymerization in the aqueous solution of the prepolymer in a second polymerization stage.

7. The process according to claim 6, wherein the solution of the prepolymer is diluted with water so that the resulting aqueous solution/dispersion has a concentration of from 2 to 35% by weight.

8. The process according to claim 6, wherein the emulsion polymerization is carried out in the presence of a redox catalyst.

9. A paper product having applied thereto a finely divided, amphoteric aqueous polymer dispersion according to claim 1 as a size.

10. A board having applied thereto a finely divided, amphoteric aqueous polymer dispersion according to claim 1 as a size.

11. A cardboard product having applied thereto a finely divided, amphoteric aqueous polymer dispersion according to claim 1 as a size.

12. A leather product having applied thereto a finely divided, amphoteric aqueous polymer dispersion according to claim 1 as a coating.

13. A textile product having applied thereto a finely divided, amphoteric aqueous polymer dispersion according to claim 1 as a coating.

* * * * *